United States Patent
Bengtsson et al.

(10) Patent No.: US 7,953,862 B2
(45) Date of Patent: May 31, 2011

(54) METHODS FOR ACCESSING A PHONE-BASED WEB SERVER WITH A PRIVATE IP ADDRESS AND RELATED ELECTRONIC DEVICES AND COMPUTER PROGRAM PRODUCTS

(75) Inventors: Henrik Bengtsson, Lund (SE); Bo Larsson, Malmö (SE)

(73) Assignee: Sony Ericsson Mobile Communications AB, Lund (SE)

( * ) Notice: Subject to any disclaimer, the term of this patent is extended or adjusted under 35 U.S.C. 154(b) by 772 days.

(21) Appl. No.: 11/689,804

(22) Filed: Mar. 22, 2007

(65) Prior Publication Data

US 2008/0172449 A1   Jul. 17, 2008

Related U.S. Application Data

(60) Provisional application No. 60/880,585, filed on Jan. 16, 2007.

(51) Int. Cl.
*G06F 13/00* (2006.01)
(52) U.S. Cl. .......... 709/227; 709/229; 709/203
(58) Field of Classification Search .......... 709/227, 709/203, 229, 225; 726/2–7, 11, 12, 17
See application file for complete search history.

(56) References Cited

U.S. PATENT DOCUMENTS

| 6,952,578 | B1 * | 10/2005 | Pedersen et al. ........... 455/414.2 |
| 7,158,525 | B2 * | 1/2007 | Daffner et al. ............. 370/401 |
| 2002/0120671 | A1 * | 8/2002 | Daffner et al. ............. 709/201 |
| 2005/0004968 | A1 * | 1/2005 | Mononen et al. ........... 709/200 |
| 2005/0020234 | A1 | 1/2005 | Iivari et al. |
| 2006/0136554 | A1 * | 6/2006 | Rajaniemi et al. .......... 709/203 |
| 2006/0274726 | A1 | 12/2006 | Wikman |
| 2008/0010676 | A1 * | 1/2008 | Dosa Racz et al. ......... 726/11 |
| 2008/0098463 | A1 * | 4/2008 | Wikman .................. 726/5 |

FOREIGN PATENT DOCUMENTS

WO   WO 2004/095818 A1   11/2004

OTHER PUBLICATIONS

International Search Report and Written Opinion for PCT/EP2007/055141; date of mailing Oct. 30, 2007.

* cited by examiner

*Primary Examiner* — Kenneth R Coulter
(74) *Attorney, Agent, or Firm* — Myers Bigel Sibley & Sajovec, P.A.

(57) ABSTRACT

A Web server is provided at an electronic device by registering the Web server with an Internet server that has a public Internet Protocol address, receiving a message at the electronic device that indicates a request is forthcoming to access the Web server, establishing a communication connection with the Internet server responsive to receiving the message, receiving a request addressed to the Web server from a requesting device that is forwarded from the Internet server via the communication connection, and conveying a Web service from the Web server to the requesting device via the Internet server responsive to receiving the request.

28 Claims, 5 Drawing Sheets

METHODS FOR ACCESSING A PHONE-BASED WEB SERVER WITH A PRIVATE IP ADDRESS AND RELATED ELECTRONIC DEVICES AND COMPUTER PROGRAM PRODUCTS

CROSS REFERENCE TO RELATED APPLICATION

This application claims the benefit of and priority to U.S. Provisional Patent Application No. 60/880,585, filed Jan. 16, 2007, the disclosure of which is hereby incorporated herein by reference as if set forth in its entirety.

BACKGROUND OF THE INVENTION

The present invention relates to communication networks, and, more particularly, to methods, electronic devices, and computer program products for accessing a phone-based Web server.

The Internet is a decentralized network of computers that can communicate with one another via Internet Protocol (IP). The Internet includes the World Wide Web (WWW) service facility, which is a client/server-based facility that includes a large number of servers (computers connected to the Internet) on which Web pages or files reside, as well as clients (Web browsers), which interface users with the Web pages. The topology of the World Wide Web can be described as a network of networks, with providers of network services called Network Service Providers, or NSPs. Servers that provide application-layer services may be referred to as Application Service Providers (ASPs). Sometimes a single service provider provides both functions.

SUMMARY OF THE INVENTION

According to some embodiments of the present invention, a Web server is provided at an electronic device by registering the Web server with an Internet server that has a public Internet Protocol address, receiving a message at the electronic device that indicates a request is forthcoming to access the Web server, establishing a communication connection with the Internet server responsive to receiving the message, receiving a request addressed to the Web server from a requesting device that is forwarded from the Internet server via the communication connection, and conveying a Web service from the Web server to the requesting device via the Internet server responsive to receiving the request.

In other embodiments of the present invention, the message is a Short Message Service (SMS) message.

In still other embodiments of the present invention, the electronic device further includes an application that manages the Web server. The application is configured to monitor a port on the electronic device, the message is addressed to the port on the electronic device, and receiving the message includes: determining that the message has been received and is addressed to the port on the electronic device, and processing the message using the application that manages the Web server.

In still other embodiments of the present invention, the message is sent from the requesting device.

In still other embodiments of the present invention, the message is sent from the Internet server.

In still other embodiments of the present invention the message is a Wireless Application Protocol (WAP) Push message sent from the Internet server.

In still other embodiments of the present invention, establishing a communication connection with the Internet server includes: providing the Internet server with an identification used in registering with the Web server.

In still other embodiments of the present invention, the method further includes determining if the requesting device is allowed to access the Web server. Establishing the communication connection includes establishing the communication connection with the Internet server responsive to receiving the message and determining that the requesting device is allowed to access the Web server.

In still other embodiments of the present invention, the method further includes determining if the requesting device is allowed to access the Web server responsive to receiving the request addressed to the Web server. Conveying the Web service includes conveying the Web service from the Web server to the requesting device via the Internet server responsive to receiving the request and determining that the requesting device is allowed to access the Web server.

In other embodiments a computer program product for providing a Web server at an electronic device includes a computer readable storage medium having computer readable program code embodied therein. The computer readable program code includes computer readable program code configured to register the Web server with an Internet server that has a public Internet Protocol address, receive a message at the electronic device that indicates a request is forthcoming to access the Web server, establish a communication connection with the Internet server responsive to receiving the message, receive a request addressed to the Web server from a requesting device that is forwarded from the Internet server via the communication connection, and convey a Web service from the Web server to the requesting device via the Internet server responsive to receiving the request.

In further embodiments of the present invention, an electronic device includes a Web server and an application that is configured to manage the Web server, the application being further configured to register the Web server with an Internet server that has a public Internet Protocol address, receive a message that indicates a request is forthcoming to access the Web server, establish a communication connection with the Internet server responsive to receiving the message, receive a request addressed to the Web server from a requesting device that is forwarded from the Internet server via the communication connection. The Web server is configured to convey a Web service to the requesting device via the Internet server responsive to receiving the request.

In still further embodiments, the message is a Short Message Service (SMS) message.

In still further embodiments, the message is addressed to a port on the electronic device. The application is further configured to monitor the port on the electronic device, determine that the message has been received and is addressed to the port on the electronic device, and process the message.

In still further embodiments, the message is sent from the requesting device.

In still further embodiments, the message is sent from the Internet server.

In still further embodiments, the message is a Wireless Application Protocol (WAP) Push message sent from the Internet server.

In still further embodiments, the electronic device is a mobile terminal.

In other embodiments of the present invention, an Internet server is operated by registering a Web server associated with an electronic device, receiving a request to access the Web server from a requesting device, establishing a communication connection with the Web server, and serving as a proxy for communications between the Web server and the requesting device.

In still other embodiments, establishing the communication connection includes establishing the communication connection with the Web server responsive to a communication from the electronic device.

In still other embodiments, the method further includes sending a message to the Web server that indicates a request is forthcoming to access the Web server responsive to receiving the request from the requesting device. The communication from the electronic device is generated responsive to receipt of the message to the Web server at the electronic device.

In still other embodiments, the message is a Short Message Service (SMS) message.

In still other embodiments, the message is a Wireless Application Protocol (WAP) Push message.

In still other embodiments, the method further includes providing a Web page to the requesting device responsive to receiving the request to access the Web server, the Web page initiating a second request to access the Web server, receiving the second request to access the Web server, and forwarding the second request to access the Web server to the Web server.

In still other embodiments, the Web page is further configured to send a message to the electronic device, which indicates a request is forthcoming to access the Web server, responsive to user input.

In still other embodiments, the communication from the electronic device is generated responsive to receipt of the message at the electronic device sent via the Web page.

In still other embodiments, the message is a Short Message Service (SMS) message.

In other embodiments a computer program product for operating an Internet server includes a computer readable storage medium having computer readable program code embodied therein. The computer readable program code includes computer readable program code configured to register a Web server associated with an electronic device, receive a request to access the Web server from a requesting device, establish a communication connection with the Web server, and serve as a proxy for communications between the Web server and the requesting device.

In further embodiments of the present invention, an Internet server includes a server module, and a proxy module that is configured to register a Web server associated with an electronic device, receive a request to access the Web server from a requesting device, establish a communication connection with the Web server, and serving as a proxy for communications between the Web server and the requesting device.

In still further embodiments, the proxy module is further configured to establish the communication connection with the Web server responsive to a communication from the electronic device.

In still further embodiments, the proxy module is further configured to send a message to the Web server that indicates a request is forthcoming to access the Web server responsive to receiving the request from the requesting device.

In still further embodiments, the message is a Short Message Service (SMS) message.

In still further embodiments, the message is a Wireless Application Protocol (WAP) Push message.

In still further embodiments, the server module is configured to provide a Web page to the requesting device responsive to the proxy module receiving the request to access the Web server, the Web page being configured to initiate a second request to access the Web server. The proxy module is further configured to receive the second request to access the Web server and to forward the second request to access the Web server to the Web server.

In still further embodiments, the Web page is further configured to send a message to the electronic device, which indicates a request is forthcoming to access the Web server, responsive to user input.

In still further embodiments, the communication from the electronic device is generated responsive to receipt of the message at the electronic device sent via the Web page.

In still further embodiments, the message is a Short Message Service (SMS) message.

BRIEF DESCRIPTION OF THE DRAWINGS

Other features of the present invention will be more readily understood from the following detailed description of specific embodiments thereof when read in conjunction with the accompanying drawings, in which.

DETAILED DESCRIPTION OF EMBODIMENTS

While the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like reference numbers signify like elements throughout the description of the figures.

As used herein, the singular forms "a," "an," and "the" are intended to include the plural forms as well, unless expressly stated otherwise. It should be further understood that the terms "comprises" and/or "comprising" when used in this specification is taken to specify the presence of stated features, integers, steps, operations, elements, and/or components, but does not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The present invention may be embodied as methods, electronic devices, and/or computer program products. Accordingly, the present invention may be embodied in hardware and/or in software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, or device. More specific examples (a nonexhaustive list) of the computer-readable medium would include the following: a portable computer diskette, a random access memory (RAM), a read-only memory (ROM), an erasable programmable read-only memory (EPROM or Flash memory), and a compact disc read-only memory (CD-ROM).

As used herein, the term "mobile terminal" may include a satellite or cellular radiotelephone with or without a multi-line display; a Personal Communications System (PCS) terminal that may combine a cellular radiotelephone with data processing, facsimile and data communications capabilities; a PDA that can include a radiotelephone, pager, Internet/intranet access, Web browser, organizer, calendar and/or a global positioning system (GPS) receiver; and a conventional laptop and/or palmtop receiver or other appliance that includes a radiotelephone transceiver. Mobile terminals may also be referred to as "pervasive computing" devices.

For purposes of illustration, embodiments of the present invention are described herein in the context of a mobile terminal. It will be understood, however, that the present invention is not limited to such embodiments and may be embodied generally as an electronic device that includes a Web server thereon.

Some embodiments of the present invention stem from a realization that although a mobile terminal's Internet Protocol (IP) address is typically not publicly available, a mobile terminal may nevertheless host a Web server thereon and register with an Internet server that has a public IP address. The Internet server may then serve as a proxy in forwarding communications between devices requesting access to the Web server on the mobile terminal and the mobile terminal.

Figure 1:
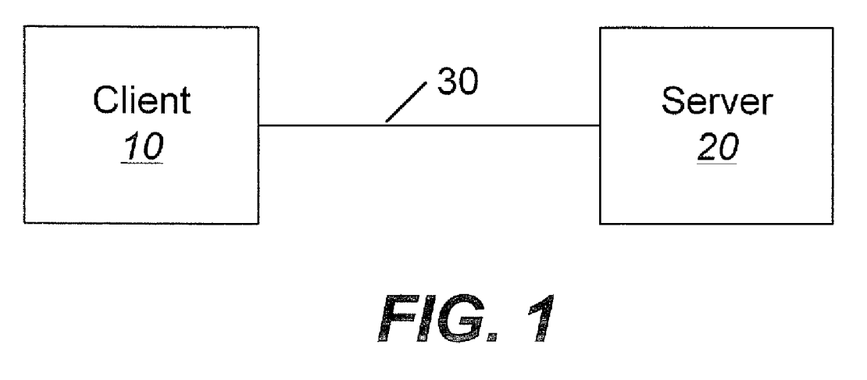
FIG. 1 is a block diagram that illustrates a client-server environment in accordance with some embodiments of the present invention.

Embodiments according to the invention can operate in a logically separated client side/server side-computing environment, sometimes referred to hereinafter as a client/server environment. As shown in FIG. 1, a client 10 may communicate with a server 20 over a wireless and/or wireline communication medium 30. The client/server environment is a computational architecture that involves a client process (i.e., a client) requesting service from a server process (i.e., a server). In general, the client/server environment maintains a distinction between processes, although client and server processes may operate on different machines or on the same machine. Accordingly, the client and server sides of the client/server environment are referred to as being logically separated. Usually, when client and server processes operate on separate devices, each device can be customized for the needs of the respective process. For example, a server process can "run on" a system having large amounts of memory and disk space, whereas the client process often "runs on" a system having a graphic user interface provided by high-end video cards and large-screen displays.

A client can be a program, such as a Web browser, that requests information, such as web pages, from a server under the control of a user. Examples of clients include browsers such as Netscape Navigator® (America Online, Inc., Dulles, Va.) and Internet Explorer® (Microsoft Corporation, Redmond, Wash.). Browsers typically provide a graphical user interface for retrieving and viewing web pages, web portals, applications, and other resources served by Web servers. A SOAP client can be used to request web services programmatically by a program in lieu of a web browser. The applications provided by the service providers may execute on a server. The server can be a program that responds to the requests from the client. Some examples of servers are International Business Machines Corporation's family of Lotus Domino® servers, the Apache server and Microsoft's Internet Information Server (IIS) (Microsoft Corporation, Redmond, Wash.).

The clients and servers can communicate using a standard communications mode, such as Hypertext Transport Protocol (HTTP) and SOAP. According to the HTTP request-response communications model, HTTP requests are sent from the client to the server and HTTP responses are sent from the server to the client in response to an HTTP request. In operation, the server waits for a client to open a connection and to request information, such as a Web page. In response, the server sends a copy of the requested information to the client, closes the connection to the client, and waits for the next connection. It will be understood that the server can respond to requests from more than one client.

Figure 2:
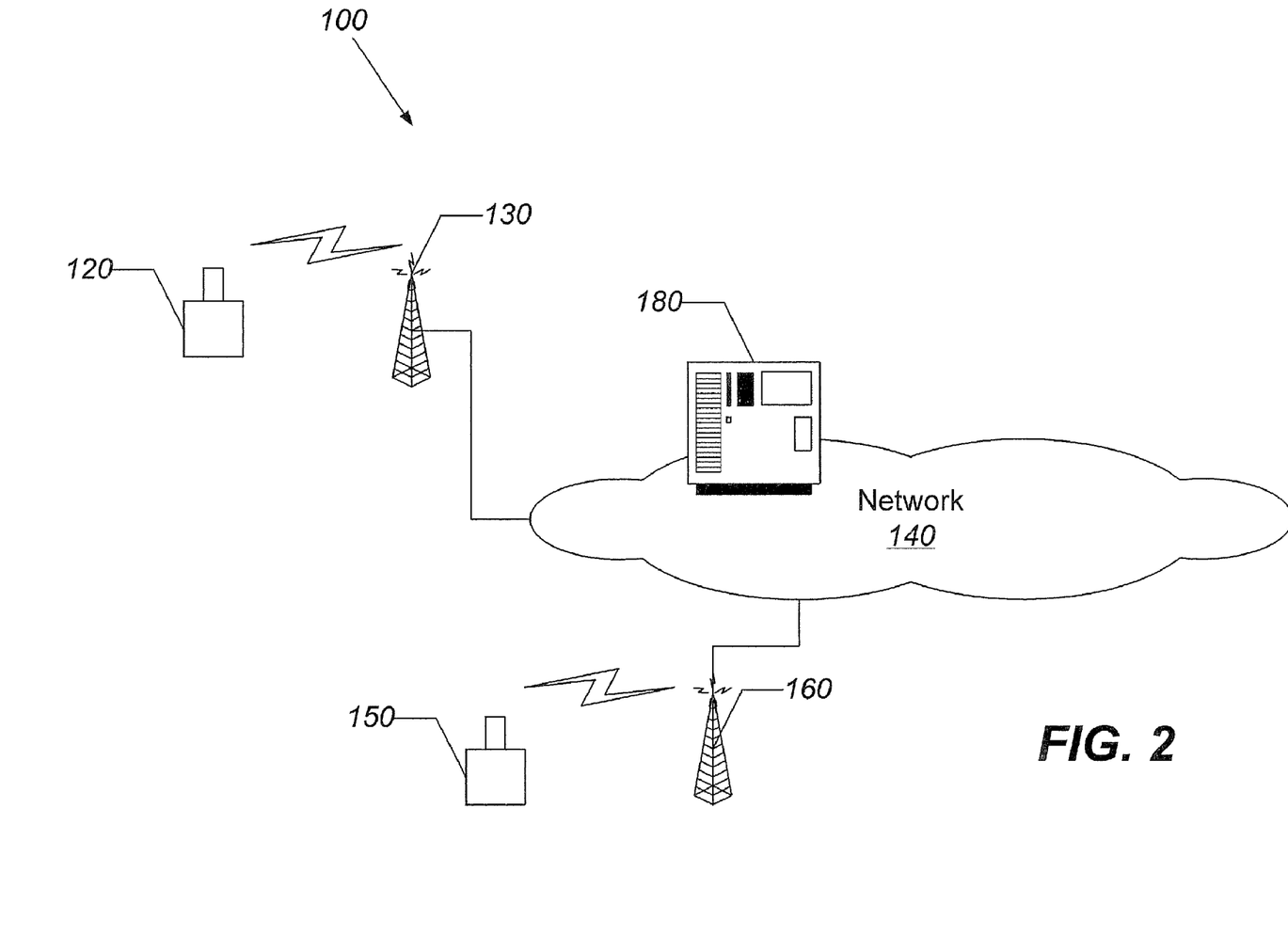
FIG. 2 is a is a block diagram that illustrates a communication network in accordance with some embodiments of the present invention.

Referring now to FIG. 2, a network architecture, according to some embodiments of the present invention, includes a mobile terminal 120 that includes a Web server thereon, a mobile terminal 150, and an Internet server 180 that are connected via a network 140 as shown. The network 140 includes wireless base station transceivers 130 and 160 that may facilitate wireless communication with the mobile terminals 120 and 150, respectively. The network 140 may represent a global network, such as the Internet, or other publicly accessible network. The network 140 may also, however, represent a wide area network, a local area network, an Intranet, or other private network, which may not accessible by the general public. Furthermore, the network 140 may represent a combination of public and private networks or a virtual private network (VPN). Moreover, devices 120 and 130 are described as mobile terminals for purposes of illustrating some embodiments of the present invention. It will be understood that device 150 may be any electronic device that is capable of accessing a Web server using, for example, a Web browser. Device 120 may be any electronic device that is capable of hosting a Web server.

Mobile terminal 120 may have a private IP address in accordance with some embodiments of the present invention. The Internet server 180, however, may have a public IP address that may be accessible via, for example, the Domain Name System (DNS). The DNS may be used to translate domain names, such as computer host names, to IP addresses.

Although FIG. 2 illustrates an exemplary communication network, it will be understood that the present invention is not limited to such configurations, but is intended to encompass any configuration capable of carrying out the operations described herein.

Figure 3:
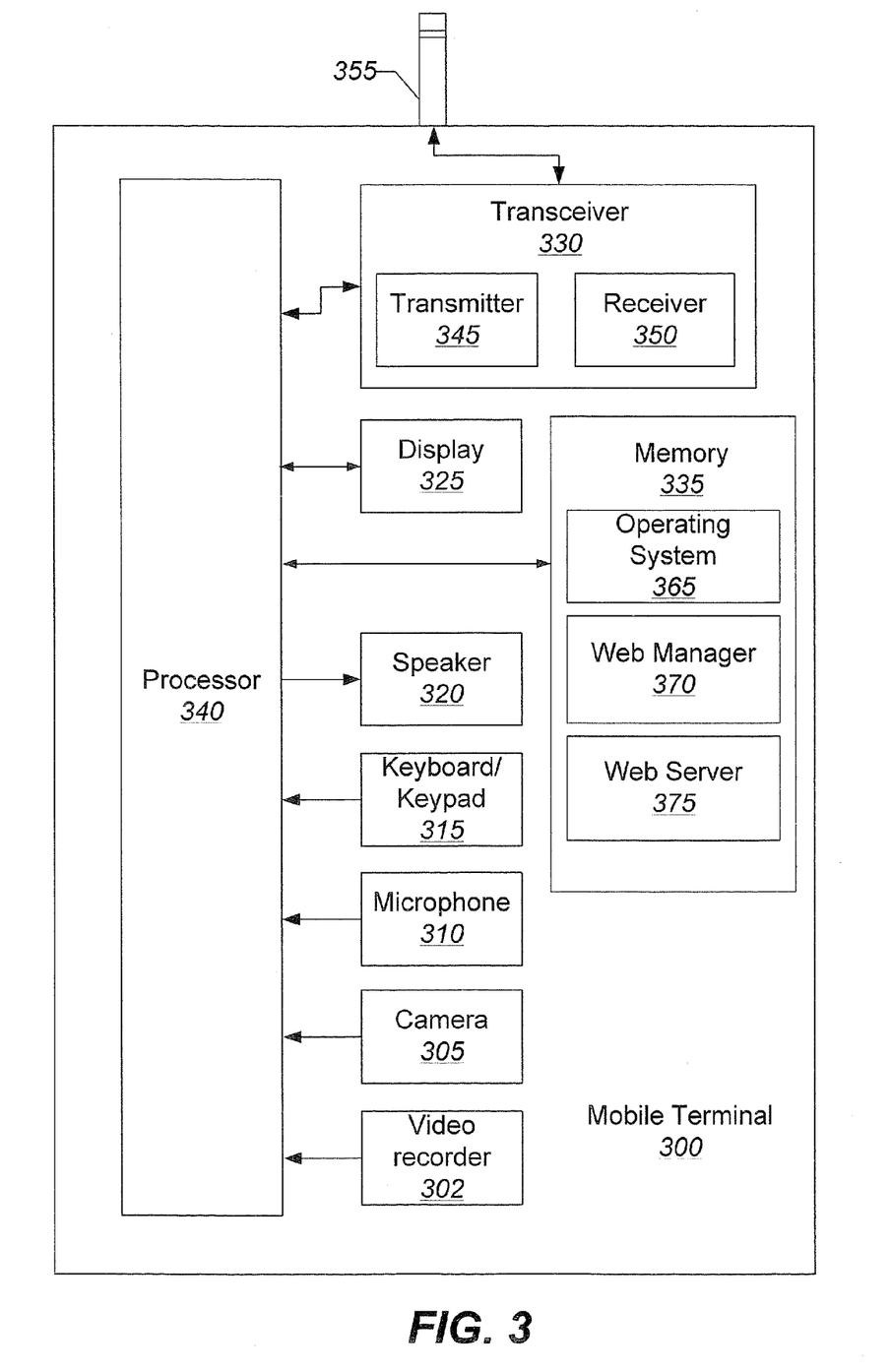
FIG. 3 is a block diagram that illustrates an electronic device/mobile terminal in accordance with some embodiments of the present invention.

Referring now to FIG. 3, an exemplary mobile terminal 300 that may be used to implement mobile terminal 120 of FIG. 2, in accordance with some embodiments of the present invention, includes a video recorder 302, a camera 305, a microphone 310, a keyboard/keypad 315, a speaker 320, a display 325, a transceiver 330, and a memory 335 that communicate with a processor 340. The transceiver 330 comprises a transmitter circuit 345 and a receiver circuit 350, which respectively transmit outgoing radio frequency signals to base station transceivers and receive incoming radio frequency signals from the base station transceivers via an antenna 355. The radio frequency signals transmitted between the mobile terminal 300 and the base station transceivers may comprise both traffic and control signals (e.g., paging signals/messages for incoming calls), which are used to establish and maintain communication with another party or destination. The radio frequency signals may also comprise packet data information, such as, for example, cellular digital packet data (CDPD) information. The foregoing components of the mobile terminal 300 may be included in many conventional mobile terminals and their functionality is generally known to those skilled in the art.

The processor 340 communicates with the memory 335 via an address/data bus. The processor 340 may be, for example, a commercially available or custom microprocessor. The memory 335 is representative of the one or more memory devices containing the software and data used to provide a phone-based Web server with a private IP address, in accordance with some embodiments of the present invention. The memory 335 may include, but is not limited to, the following types of devices: cache, ROM, PROM, EPROM, EEPROM, flash, SRAM, and DRAM.

As shown in FIG. 3, the memory 335 may contain up to three or more categories of software and/or data: the operating system 365, a Web server manager 370, and a Web server 375. The operating system 365 generally controls the operation of the mobile terminal 300. In particular, the operating system 365 may manage the mobile terminal's software and/or hardware resources and may coordinate execution of programs by the processor 340. The Web manager 370 may be configured to register the Web server with an Internet server, such as the Internet server 180 of FIG. 2, and to serve as a front end for communications between the Internet server and the Web server 375. The Web server 375 may be configured to convey a Web service to a requesting device(s) responsive to request(s) received from devices that are forwarded through the Internet server with which the Web server 375 has registered. The Web server may provide a variety of Web services, such as, but not limited to, a blog, photo album, audio/video files for streaming or downloading, and the like.

Although FIG. 3 illustrates an exemplary software and hardware architecture that may be used to provide a phone-based Web server with a private IP address it will be understood that the present invention is not limited to such a configuration, but is intended to encompass any configuration capable of carrying out the operations described herein.

Computer program code for carrying out operations of devices and/or systems discussed above with respect to FIGS. 1-3 may be written in a high-level programming language, such as Java, C, and/or C++, for development convenience. In addition, computer program code for carrying out operations of embodiments of the present invention may also be written in other programming languages, such as, but not limited to, interpreted languages. Some modules or routines may be written in assembly language or even micro-code to enhance performance and/or memory usage. It will be further appreciated that the functionality of any or all of the program modules may also be implemented using discrete hardware components, one or more application specific integrated circuits (ASICs), or a programmed digital signal processor or microcontroller.

The present invention is described hereinafter with reference to message flow diagram illustrations of methods, mobile terminals, Internet servers, and/or computer program products in accordance with some embodiments of the invention.

These message flow diagrams further illustrate exemplary operations of providing a phone-based Web server with a private IP address in accordance with some embodiments of the present invention. It will be understood that each message, and combinations of messages in the message flow diagram illustrations, may be generated/implemented by computer program instructions and/or hardware operations. These computer program instructions may be provided to a processor of a general purpose computer, a special purpose computer, or other programmable data processing apparatus to produce a machine, such that the instructions, which execute via the processor of the computer or other programmable data processing apparatus, create means for implementing the functions specified in the message flow diagram(s).

These computer program instructions may also be stored in a computer usable or computer-readable memory that may direct a computer or other programmable data processing apparatus to function in a particular manner, such that the instructions stored in the computer usable or computer-readable memory produce an article of manufacture including instructions that implement the function specified in the message flow diagram(s).

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the message flow diagram(s).

Figure 4:
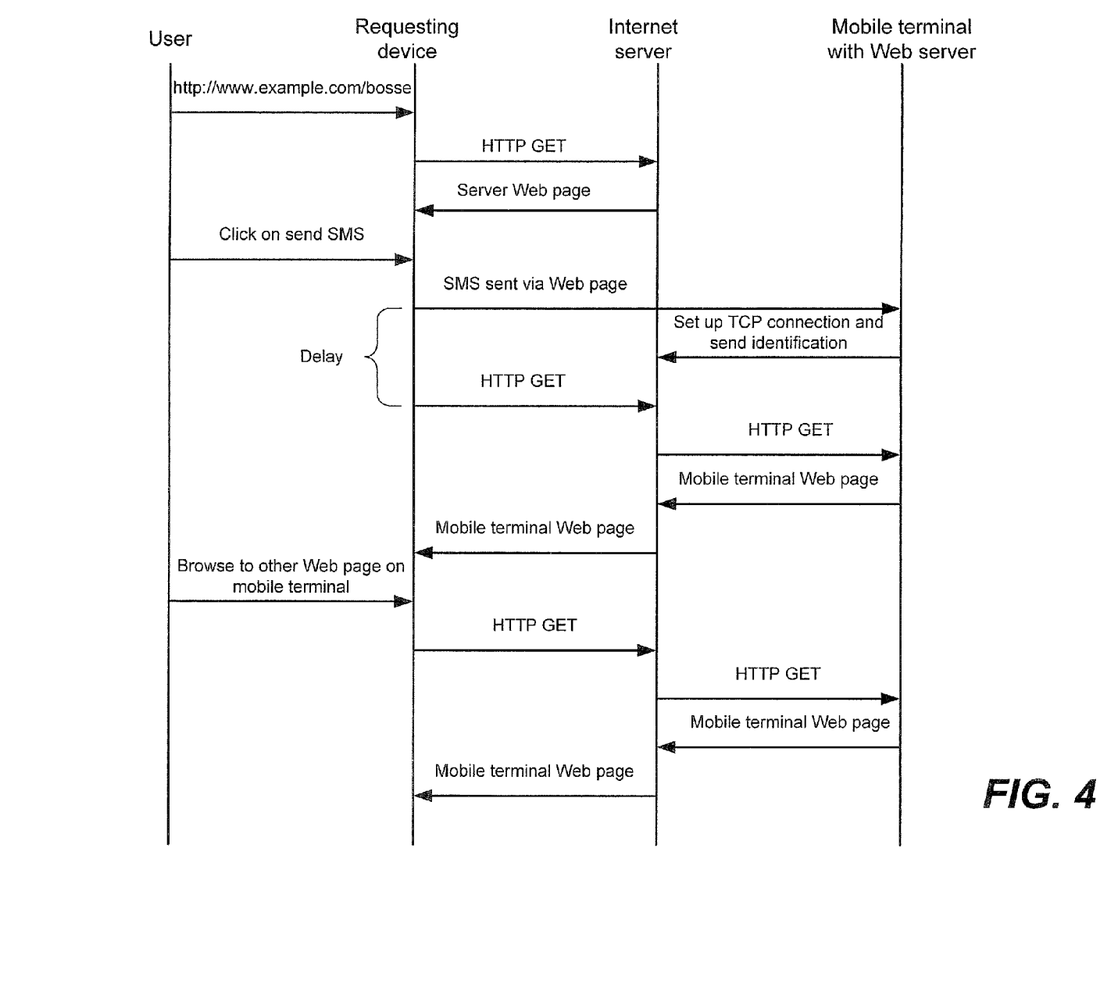
FIGS. 4 and 5 are message flow diagrams that illustrate operations for providing a phone-based Web server with a private IP address in accordance with some embodiments of the present invention.

FIG. 4 is a message flow diagram that illustrates operations for providing a phone-based Web server with a private IP address in accordance with some embodiments of the present invention. Referring to FIG. 4 and FIGS. 2 and 3, a user of mobile terminal 150 of FIG. 2 enters the URL (http://www.example.com/bosse) for the Web server 375 of mobile terminal 120 into a Web browser. Mobile terminal 150 does an HTTP:GET towards the Internet site www.example.com, which is the domain name of the Internet server 180. The Web server 375 is not directly accessed because the IP address of mobile terminal 120 is private. The domain name for the Internet server 180, however, can be translated to a public IP address through DNS.

The Internet server 180 responds to the requesting mobile terminal 150 with a Web page. The Web page may include a user interface that allows the user to send a message directly to the mobile terminal 120. In accordance with some embodiments of the present invention, the user may cause the mobile terminal 150 to send a Short Message Service (SMS) message to the mobile terminal 120 using, for example, a Java script that executes on the mobile terminal 150. Note that the Web page provided by the Internet server includes the phone number for the mobile terminal 120 because the Web manager 370 has previously registered the Web server 375 of the mobile terminal 120 with the Internet server 180 as discussed above with respect to FIG. 3.

The SMS message may be addressed to a specific port on the mobile terminal 120 and the Web manager 370 may be configured to subscribe or monitor that port to allow the Web manager 370 to receive and process the SMS message.

Receipt of the SMS message by the Web manager 370 at the mobile terminal 120 triggers the Web manager 370 to establish a communication connection with the Internet server 180. In some embodiments of the present invention, the communication connection may be a Transmission Control Protocol (TCP) connection. The Web manager 370 may provide an identification of the mobile terminal 120 that was used to register the Web server 375 with the Internet server 180 so that the Internet server 180 can determine which request URLs to forward to the Web server 375 on the mobile terminal 120.

After approximately a few seconds or another threshold delay time have passed since the SMS message was sent from the mobile terminal 150 to the mobile terminal 120, a second HTTP:GET is sent from the mobile terminal 150 addressed to the Web server 375 on the mobile terminal 120. This HTTP: GET may be generated automatically by the Web page provided by the Internet server 180 to the requesting mobile terminal 150 in accordance with some embodiments of the present invention. This threshold delay time may be used to allow the SMS message to be sent from the mobile terminal 150 to the mobile terminal 120 and to be processed by the Web manager 370 at the mobile terminal 120.

The Internet server 180 recognizes that the HTTP:GET received from the mobile terminal 150 should be passed on to the Web server 375 on the mobile terminal 120 over the TCP connection because the Internet server 180 had associated the identity of the mobile terminal 120 with the TCP connection when the TCP connection was established.

The Web server 375 responds with the requested Web page, which is received at the Internet server 180 over the TCP connection. The Internet server 180 then forwards the requested Web page from the Web server 375 to the requesting mobile terminal 150.

The Web page from the Web server 375 on the mobile terminal 120 may include, for example, a blog, camera album, or other type of Web service. As shown in FIG. 4, a user may click on a link to another Web page on the Web server 375 causing the mobile terminal 150 to send an HTTP:GET to the Internet server 180. The Internet server 180 sends the HTTP: GET to the Web server 375 on the mobile terminal 120 over the TCP connection. The Web server 375 responds to the HTTP:GET with the requested Web page, which the Internet server 180 forwards on to the mobile terminal 150.

Advantageously, as discussed above, some embodiments of the present invention may allow an Internet server that has a public IP address to serve as a proxy for accessing a Web server on an electronic device, such as a mobile terminal, that has a private IP address. Moreover, the electronic device that desires access to the Web server having a private IP address associated therewith requires no special software or hardware to be installed. Any Web browser may be used to access the Web server associated with the private IP address.

Figure 5:
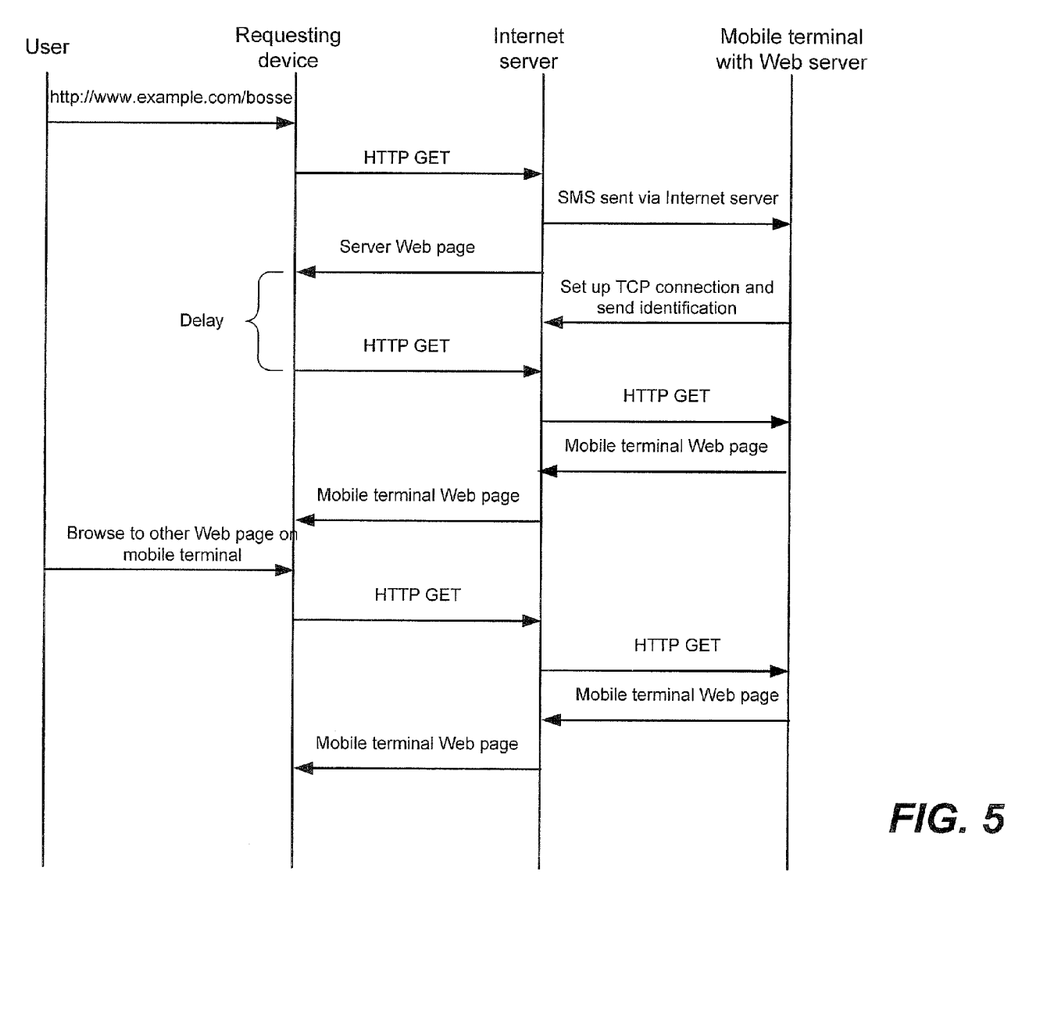

FIG. 5 is a message flow diagram that illustrates operations for providing a phone-based Web server with a private IP address in accordance with further embodiments of the present invention. A difference between the operations of FIG. 5 and the operations of FIG. 4 is that the Internet server 180 sends the message to the Web server 375 on the mobile terminal 120 to initiate establishment of the communication connection, e.g., TCP connection, between the Internet server 180 and the mobile terminal 120.

Referring to FIG. 5 and FIGS. 2 and 3, a user of mobile terminal 150 of FIG. 2 enters the URL (http://www.example-.com/bosse) for the Web server 375 of mobile terminal 120 into a Web browser. Mobile terminal 150 does an HTTP:GET towards the Internet site www.example.com, which is the domain name of the Internet server 180. As discussed with reference to FIG. 4, the Web server 375 is not directly accessed because the IP address of mobile terminal 120 is private.

The Internet server 180 responds to receipt of the HTTP: GET message by sending a message, such as an SMS message, to the mobile terminal 120. The SMS message may be addressed to a specific port on the mobile terminal 120 and the Web manager 370 may be configured to subscribe or monitor that port to allow the Web manager 370 to receive and process the SMS message. In other embodiments, the Internet server 180 may send a Wireless Application Protocol (WAP) Push message to the mobile terminal 120. The WAP uses application level addressing instead of port addressing.

The Internet server 180 also responds to receipt of the HTTP:GET message with a Web page. The Web page may include a user interface that informs the user to wait while the connection is being made between the Internet server 180 and the Web server 375 on the mobile terminal 120.

Receipt of the SMS/WAP Push message by the Web manager 370 at the mobile terminal 120 triggers the Web manager 370 to establish a communication connection with the Internet server 180. As discussed above with reference to FIG. 4, the communication connection may be a TCP connection. The Web manager 370 may provide an identification of the mobile terminal 120 that was used to register the Web server 375 with the Internet server 180 so that the Internet server 180 can determine which request URLs to forward to the Web server 375 on the mobile terminal 120.

After approximately a few seconds or another threshold delay time have passed since the Internet server 180 sent the Web page to the mobile terminal 150, i.e., requesting device, a second HTTP:GET is sent from the mobile terminal 150 addressed to the Web server 375 on the mobile terminal 120. This HTTP:GET may be generated automatically by the Web page provided by the Internet server 180 to the requesting mobile terminal 150 in accordance with some embodiments of the present invention. This threshold delay time may be used to allow the establishment of the TCP communication connection between the Internet server 180 and the mobile terminal 120 to be set up responsive to the SMS/WAP Push message sent from Internet server 180 to the mobile terminal 120.

The Internet server 180 recognizes that the HTTP:GET received from the mobile terminal 150 should be passed on to the Web server 375 on the mobile terminal 120 over the TCP connection because the Internet server 180 had associated the identity of the mobile terminal 120 with the TCP connection when the TCP connection was established.

The Web server 375 responds with the requested Web page, which is received at the Internet server 180 over the TCP connection. The Internet server 180 then forwards the requested Web page from the Web server 375 to the requesting mobile terminal 150.

A user of the mobile terminal 150 may perform further browsing operations on the Web server 375 of the mobile terminal 120 with the Internet server 180 acting as a proxy for communications between the two devices as discussed above with respect to FIG. 4.

In the embodiments of FIG. 5, the Internet server 180 may generate the SMS message used to initiate establishment of the communication connection between the Internet server 180 and the mobile terminal 120, which includes the Web server 375. Thus, the owner of the Internet server 180 may be responsible for the cost of the SMS messaging. By contrast, in the embodiments of FIG. 4, the user of mobile terminal 150 may be responsible for the SMS messaging costs.

In the embodiments of both FIGS. 4 and 5, access control may be implemented for enhanced security. For example, referring to FIG. 4, the Web manager 370 may compare the phone number of mobile terminal 150 associated with the incoming SMS message with a predefined whitelist. Or, in other embodiments, the user of mobile terminal 120 having the Web server 375 thereon may be prompted with an option to allow the calling name/calling number associated with mobile terminal 150 to access the Web server 375. The TCP connection between the Internet server 180 and the mobile terminal 120 may not be established if access is denied. If access is allowed, however, the TCP connection may be established for the use of mobile terminal 150 only. This may be implemented, for example, by the Internet server 180 creating a unique identification or hash code for mobile terminal 150 the first time mobile terminal 150 contacts the Internet server 180. The unique identification or hash code may be communicated to the mobile terminal 150 via the Internet server's 180 Web page. The mobile terminal 150 may communicate the unique identification or hash code to the mobile terminal 120 via the SMS message, and the mobile terminal 120 may include the unique identification or hash code when sending its identification to the Internet server 180 during setup of the TCP connection. The Internet server 180 will know that the mobile terminal 150 is allowed to access the Web server 375 on mobile terminal 120 because the hash code associated with the mobile terminal 150 matches the hash code of mobile terminal 150 received from mobile terminal 120 during setup of the TCP connection. With respect to the embodiments of FIG. 5, conventional HTTP authentication techniques can be used to authenticate mobile terminal 150.

The message flow diagrams of FIGS. 4 and 5 illustrate the architecture, functionality, and operations of embodiments of methods, electronic devices, Internet servers, and/or computer program products for providing a phone-based Web server with a private IP address. In this regard, each message and associated communication represents a module, segment, or portion of code, which comprises one or more executable instructions for implementing the specified logical function(s). It should also be noted that in other implementations, the message(s) noted in the blocks may occur out of the order noted in FIGS. 4 and 5. For example, two messages shown in succession may, in fact, be communicated substantially concurrently or the messages may sometimes be communicated in the reverse order, depending on the functionality involved.

Many variations and modifications can be made to the embodiments without substantially departing from the principles of the present invention. All such variations and modifications are intended to be included herein within the scope of the present invention, as set forth in the following claims.

That which is claimed:

1. A method of providing a Web server at an electronic device, comprising:
    registering the Web server with an Internet server that has a public Internet Protocol address;
    receiving a message at the electronic device sent from a requesting device, responsive to input from a user of the requesting device received via a message interface provided by the Internet server, that indicates a request is forthcoming to access the Web server;
    establishing a communication connection with the Internet server responsive to receiving the message that indicates a request is forthcoming;
    receiving a request addressed to the Web server from the requesting device that is forwarded from the Internet server via the communication connection; and
    conveying a Web service from the Web server to the requesting device via the Internet server responsive to receiving the request.

2. The method of claim 1, wherein the message that indicates a request is forthcoming is a Short Message Service (SMS) message.

3. The method of claim 2, wherein the electronic device further comprises an application that manages the Web server, the application being configured to monitor a port on the electronic device, wherein the message that indicates a request is forthcoming is addressed to the port on the electronic device, and wherein receiving the request indication message comprises:
    determining that the message that indicates a request is forthcoming has been received and is addressed to the port on the electronic device; and
    processing the message that indicates a request is forthcoming using the application that manages the Web server.

4. The method of claim 1, wherein the message that indicates a request is forthcoming is a Wireless Application Protocol (WAP) Push message sent from the Internet server.

5. The method of claim 1, wherein establishing a communication connection with the Internet server comprises:
    providing the Internet server with an identification used in registering with the Web server.

6. The method of claim 1, further comprising:
    determining if the requesting device is allowed to access the Web server; and
    wherein establishing the communication connection comprises:
    establishing the communication connection with the Internet server responsive to receiving the message that indicates a request is forthcoming and determining that the requesting device is allowed to access the Web server.

7. The method of claim 1, further comprising:
    determining if the requesting device is allowed to access the Web server responsive to receiving the request addressed to the Web server; and
    wherein conveying the Web service comprises:
    conveying the Web service from the Web server to the requesting device via the Internet server responsive to receiving the request and determining that the requesting device is allowed to access the Web server.

8. A computer program product comprising computer-readable program code embodied on a computer-readable medium, the computer readable program code being configured to carry out the method of claim 1.

9. An electronic device, comprising:
    a Web server; and
    an application that is configured to manage the Web server, the application being further configured to register the Web server with an Internet server that has a public Internet Protocol address, receive a message sent from a requesting device, responsive to input from a user of the requesting device received via a message interface provided by the Internet server, that indicates a request is forthcoming to access the Web server, establish a communication connection with the Internet server responsive to receiving the message that indicates a request is forthcoming, receive a request addressed to the Web server from the requesting device that is forwarded from the Internet server via the communication connection; and wherein the Web server is configured to convey a Web service to the requesting device via the Internet server responsive to receiving the request.

10. The electronic device of claim 9, wherein the request indication message is a Short Message Service (SMS) message.

11. The electronic device of claim 10, wherein the request indication message is addressed to a port on the electronic device, and wherein the application is further configured to monitor the port on the electronic device, determine that the request indication message has been received and is addressed to the port on the electronic device, and process the request indication message.

12. The electronic device of claim 9, wherein the message that indicates a request is forthcoming is a Wireless Application Protocol (WAP) Push message sent from the Internet server.

13. The electronic device of claim 9, wherein the electronic device is a mobile terminal.

14. A method of operating an Internet server, comprising:
registering a Web server associated with an electronic device;
receiving a request to access the Web server from a requesting device;
establishing a communication connection with the Web server responsive to a communication from the electronic device;
serving as a proxy for communications between the Web server and the requesting device; and
sending a message to the Web server that indicates a request is forthcoming to access the Web server responsive to receiving the request from the requesting device;
wherein the communication from the electronic device is generated responsive to receipt of the message that indicates a request is forthcoming to the Web server at the electronic device.

15. The method of claim 14, wherein the message that indicates a request is forthcoming is a Short Message Service (SMS) message.

16. The method of claim 14, wherein the message that indicates a request is forthcoming is a Wireless Application Protocol (WAP) Push message.

17. The method of claim 14, further comprising:
providing a Web page to the requesting device responsive to receiving the request to access the Web server, the Web page initiating a second request to access the Web server;
receiving the second request to access the Web server; and
forwarding the second request to access the Web server to the Web server.

18. The method of claim 17, wherein the Web page is further configured to send a message to the electronic device, which indicates a request is forthcoming to access the Web server, responsive to user input.

19. The method of claim 18, wherein the communication from the electronic device is generated responsive to receipt of the message that indicates a request is forthcoming at the electronic device sent via the Web page.

20. The method of claim 18, wherein the message that indicates a request is forthcoming is a Short Message Service (SMS) message.

21. A computer program product comprising computer-readable program code embodied on a computer-readable medium, the computer readable program code being configured to carry out the method of claim 14.

22. An Internet server, comprising:
a server module; and
a proxy module that is configured to register a Web server associated with an electronic device, receive a request to access the Web server from a requesting device, establish a communication connection with the Web server responsive to a communication from the electronic device, and serve as a proxy for communications between the Web server and the requesting device;
wherein the proxy module is further configured to send a message to the Web server that indicates a request is forthcoming to access the Web server responsive to receiving the request from the requesting device.

23. The Internet server of claim 22, wherein the message that indicates a request is forthcoming is a Short Message Service (SMS) message.

24. The Internet server of claim 22, wherein the message that indicates a request is forthcoming is a Wireless Application Protocol (WAP) Push message.

25. The Internet server of claim 22, wherein the server module is configured to provide a Web page to the requesting device responsive to the proxy module receiving the request to access the Web server, the Web page being configured to initiate a second request to access the Web server; and
wherein the proxy module is further configured to receive the second request to access the Web server and to forward the second request to access the Web server to the Web server.

26. The Internet server of claim 25, wherein the Web page is further configured to send a message to the electronic device, which indicates a request is forthcoming to access the Web server, responsive to user input.

27. The Internet server of claim 26, wherein the communication from the electronic device is generated responsive to receipt of the message that indicates a request is forthcoming at the electronic device sent via the Web page.

28. The Internet server of claim 26, wherein the message that indicates a request is forthcoming is a Short Message Service (SMS) message.

* * * * *